United States Patent [19]

Parsons

[11] Patent Number: 4,688,113
[45] Date of Patent: Aug. 18, 1987

[54] APPARATUS FOR CALIBRATING TAPE DRIVE READ SYSTEM

[75] Inventor: Dale W. Parsons, Tulsa, Okla.

[73] Assignee: Telex Computer Products, Inc., Tulsa, Okla.

[21] Appl. No.: 782,987

[22] Filed: Oct. 1, 1985

[51] Int. Cl.⁴ .......................... G11B 5/02; G11B 27/36
[52] U.S. Cl. ......................................... 360/67; 360/31
[58] Field of Search .............................. 360/67, 46, 31

[56] References Cited

U.S. PATENT DOCUMENTS

| | | | |
|---|---|---|---|
| 3,660,821 | 5/1972 | Weber et al. | 360/67 |
| 3,879,674 | 4/1975 | Dragon | 360/67 |
| 4,274,117 | 6/1981 | Tomira | 360/31 |
| 4,346,411 | 8/1982 | Bohler et al. | 360/67 |

Primary Examiner—Vincent P. Canney
Attorney, Agent, or Firm—Head Johnson Stevenson

[57] ABSTRACT

An apparatus for calibrating the gain in a tape drive read system, so that with a calibrated signal source, the output of the read system will be a clean, square wave, digitized signal. Means are provided for taking the output of a read head, reading signals from a tape, applying a controlled attenuation to the signals, such that the output of the read system will be of a correct amplitude output. A sensor assembly including a comparator, is used to monitor the output voltage from the read system, and to provide appropriate signals to the attenuator until the analog output voltage of the read signal is correct.

3 Claims, 1 Drawing Figure

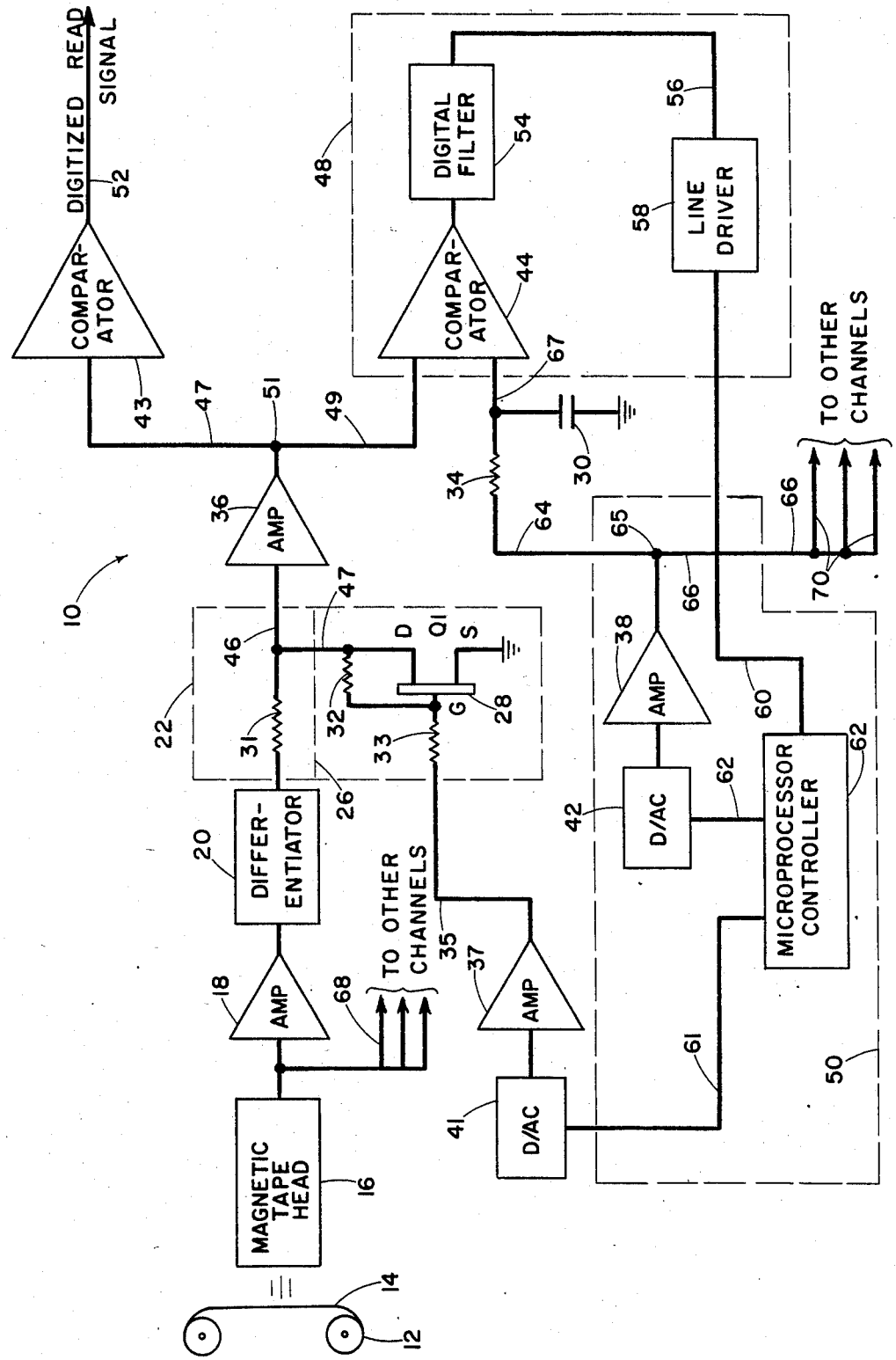

ns,113

APPARATUS FOR CALIBRATING TAPE DRIVE READ SYSTEM

BACKGROUND OF THE INVENTION

1. Field of the Invention

This invention lies in the field of magnetic digital tape read systems. More particularly, it concerns means for automatically calibrating the amplification in the read system so that the output signal will be of the proper magnitude.

2. Description of the Prior Art

In the prior art it has been customary to provide a manually controlled attenuator so that a technician reading voltages on a cathode ray tube can adjust the potentiometer to provide the proper through gain for the proper output signals from the read system. This manual involvement, of course, has many disadvantages, and the present invention is designed to overcome the limitations of the prior art to provide an automatic means for adjusting the gain of the read system in response to a calibrated tape.

SUMMARY OF THE INVENTION

It is a primary object of this invention to provide a tape read system, which, with a calibrated signal source will provide a proper output digital voltage.

It is a further object of this invention to make this calibration automatic in response to a push button action.

The read system is more or less conventional except for the fact that there is a voltage-controlled-potentiometer inserted in series with the magnetic tape head output, an amplifier, a differentiator, and an output amplifier. The output of the output amplifier then goes to a first comparator, which is used to convert the output from the read system into square wave digital signals.

The amplitude of the signal from the output amplifier goes to a sensor including a second comparator, which monitors this level, and when it is not correct, it sends a first signal to a microprocessor control means, and when it is correct, it sends a second different signal. These signals then pass to the microprocessor controller which in response to the signals creates a first D.C. voltage of the proper amplitude, as a reference voltage for the second comparator. When the output amplifier portion of the read system is at a proper amplitude, with respect to the reference voltage, then the second comparator signals the controller.

The microprocessor controller also controls the voltage-controlled attenuator by providing a digital signal, a digital to analog converter, and an amplifier, the output of which goes to the gate of a field effect transistor (FET). The effective resistance between the electrodes of the FET can be varied by varying the voltage on the gate electrode. This variable resistance in conjunction with a series resistance in the read line, provides an adjustable attenuation. When the attenuation is such that the output of the read amplifier is found, by the second comparator to be correct, the microprocessor controller is signalled to hold that setting of the voltage controlled attenuator.

BRIEF DESCRIPTION OF THE DRAWINGS

These and other objects and advantages of this invention and a better understanding of the principles and details of the invention will be evident from the following description taken in conjunction with the appended drawing, which illustrates schematically, a preferred embodiment of this invention.

DESCRIPTION OF THE PREFERRED EMBODIMENT

Before explaining in detail the present invention, it is to be understood that the invention is not limited in its application to details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Referring now to the drawing, there is shown by the numeral 10 a preferred embodiment of this invention. A magnetic tape handling deck 12 and a calibrated digital tape 14 provide multiple magnetic signals to the magnetic tape read head 16 which generally has eight information tracks plus others. Each one of these tracks represents a separate reading head. The output signal will be in the nature of an analog signal or sine wave signal, is amplified by amplifier 18 and then goes to a differentiator 20. The purpose of the differentiator is to find the peaks of the oscillating signal. The differentiated signal will have zero crossings which will occur at the peaks of the read signal.

An automatic voltage controlled attenuator (VCA) indicated by the dashed outline 22 comprises a series resistor 31 and a line 46 that passes to the output amplifier 36, the output of which is at point 51. A branch line 47 from 46 passes to the drain electrode D of the FET Q1. The source electrode S goes to ground. The gate is indicated by the numeral 28 and is supplied with voltage from amplifier 37. As the voltage on line 35 varies the gate potential on 28, the resistance between D and S varies, and, in conjunction with the series resistor 31 comprises an attenuator. The voltage to the amplifier 37 is provided by a digital-to-analog converter (D/AC) 41 which is supplied with a digital signal by way of the line 61 from the microprocessor controller 62.

The ouptut from the amplifier 36 goes by line 47A to a comparator 43 and to an output line 52 which provides the controlled, digitized, read signal. The action of the comparator 43 is to take the signal on line 47A which is an analog signal, and to square it up and form a proper digital signal of proper amplitude.

The dashed rectangle 48 indicates a sensor, the purpose of which is to monitor the voltage on point 51 on the output of amplifier 36, by means of the lead 49, to a second comparator 44. On the output of the second comparator 44 is a digital filter to remove any noise that might be generated in the second comparator. The output signal of the filter 54 goes by lead 56 to a line driver 58 which supplies the signal output from the comparator 44 to the microprocessor controller 62.

The controller 62 supplies a digital signal to the digital-to-analog (D/AC) 42 over lead 62. This analog signal is amplified by amplifier 38, and is filtered by means of the series resistor 34 and capacitor 30, connected between line 64 and ground. The line 64 produces at the comparator 44 a reference voltage which is the proper magnitude for sensing when the voltage from lead point 51, over line 49 is of the correct value. The voltage on line 64 is nominally 1.5 volts DC. When the voltage on 51 is at three volts peak-to-peak then the comparator 44 changes state and produces thereby a digital signal which is recognized by the controller 62 and causes the D/AC 41 and amplifier 37 to hold that value of voltage on the voltage controlled attenuator.

For a quick review, the incoming read signal goes to amplifier 18 from the tape head 16, is differentiated, amplified at amplifier 36 and placed at the junction 51. The voltage at 51 goes by lead 47 to the first comparator 43 which converts it to a digital signal. It also goes to the second comparator 44 which has a reference voltage on line 64 which supplies a voltage of selected magnitude on the reference line 67 leading to the second comparator. When the peak voltage on 51 is at the same voltage as the reference voltage on 67, the comparator changes state and that is delivered as a signal to the controller 62 which holds constant the voltage then on the D/AC 42, and amplifier 38, which maintains that reference voltage.

If the voltage at point 51 is not of the correct value, then the attenuation injected into the line 46 by the series resistor 31 and the FET Q1 as a voltage divider, is adjusted by applying a different digital data byte to the line 61 from the controller 62 to D/AC 41 and amplifier 37. When the voltage at 51 is correct, the D/AC 41 and amplifier 37 then holds that same constant voltage, which means the same constant attenuation, and the read system is then in proper calibration.

Before the amplifier 18 there are a plurality of lines 68 which are schematically shown, to indicate that there are eight of those read channels which comprise the amplifier 18, differentiator 20, attenuator 22 and amplifier 36 and the first comparator 43. When the first track signal is in balance, then the controller is connected to a second track with its D/AC 41, amplifier 37 and attenuator 22. The controller also maintains the proper voltage on the line 64 to the second comparator, and, as before it varies the data on the line 61 until the proper attenuation is placed in that read system, to make the voltage at 51 the proper value. This is repeated for all eight channels in sequence.

Once the read system is calibrated, it need not be recalibrated for some selected period thereafter, unless some question arises in the course of operations. If that happens, then the calibration procedure is started again and carries through the nine channels as before. It is seen, therefore, that only a single controller 62 is required. Point 65 at the output of the amplifier 38 has a line 66 connected and indicated that it goes to all of the read channels. The dashed outline 50 indicates the control system, of which there is only one.

In actual practice, to calibrate a read system, the operator by manipulation of a control panel will cause a calibrated signal to be written on a tape that has been placed on the machine. This tape shall then be used as a calibrated signal source in calibrating the read system. The D/AC 42 in conjunction with amplifier 38 would at this time cause a selected fixed voltage to be applied as a threshhold voltage or reference voltage to the second comparator 44. Controller 62 would cause D/AC 41 to generate a D.C. voltage which would, in conjunction with amplifier 37 cause the transistor Q1 of the VCA 22 to exhibit minimum resistance or maximum attenuation in the read analog path. The controller 62 would progressively cause 41 to generate increasingly larger voltages, which in turn would cause the VCA to exhibit decreasing attenuation.

At some point in this repetitive process the analog signal originating on the magnetic tape head will have been amplified to a level sufficient to cause the analog signal output of amplifier 36 to exceed the threshhold voltage of comparator 44. When this occurs, comparator 44 output will change state. This change in state will be relayed by the digital filter 54 and the line driver 58 to the controller 62. The controller recognizes the state change and freezes the attenuation currently exhibited by the voltage controlled attenuator 22.

While the voltage controlled attenuator 22 shows two resistors 32 and 33, they are primarily for the purpose of minimizing distortion in the output of said VCA. It will be clear that the part of VCA 22 below the dashed line 26 can be thought of as a voltage controlled resistor.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. Apparatus for calibrating a tape drive read system, comprising:
    (a) a read system amplifier channel comprising, in series, a first amplifier, a differentiator, a voltage controlled attenuator (VCA), and a second amplifier;
    (b) first comparator means for forming a digital signal of amplitude equal to that of the analog output of said second amplifier;
    (c) control means to produce a variable D.C. voltage which is applied to said VCA to control the attenuation thereof; and
    (d) second comparator means with a first input connected to said output of said second amplifier, and a second or reference input connected to a source of voltage of selected magnitude, the second comparator providing a sensor means to determine when the signal on the output of said second amplifier is equal to a selected voltage, and to communicate this condition to said control means, which will then stop varying the D.C. voltage applied to said VCA,
whereby the gain of said read system will be of the proper value to provide the calibrated analog output from said second amplifier.

2. The apparatus as in claim 1 in which said source of voltage comprises a digital signal supplied by said control means to a D/AC, and an amplifier.

3. The apparatus as in claim 1 in which said voltage controlled attenuator (VCA) comprises:
    a series resistor of selected magnitude;
    a shunt to ground arm connected from the ouptput of said series resistor to the drain electrode of a field effect transistor (FET), the source electrode being connected to ground;
    a first A/DC and third amplifier which receives at the input thereof a digital signal of adjustable magnitude, the output of whih goes to the gate electrode of said FET, whereby as the voltage applied to said gate electrode varies, the resistance from the D to the S electrodes will vary.

* * * * *